(12) United States Patent
Lee

(10) Patent No.: US 12,278,521 B2
(45) Date of Patent: Apr. 15, 2025

(54) MOTOR STRUCTURE

(71) Applicant: MOTECQ CORPORATION, Taipei (TW)

(72) Inventor: Yi-Hsun Lee, Taipei (TW)

(73) Assignee: MOTECQ CORPORATION, Taipei (TW)

( * ) Notice: Subject to any disclaimer, the term of this patent is extended or adjusted under 35 U.S.C. 154(b) by 260 days.

(21) Appl. No.: 18/052,770

(22) Filed: Nov. 4, 2022

(65) Prior Publication Data

US 2023/0155433 A1 May 18, 2023

Related U.S. Application Data

(60) Provisional application No. 63/277,683, filed on Nov. 10, 2021.

(51) Int. Cl.
*H02K 1/2791* (2022.01)
*H02K 1/28* (2006.01)
(Continued)

(52) U.S. Cl.
CPC .......... *H02K 1/2791* (2022.01); *H02K 11/33* (2016.01); *H02K 15/03* (2013.01); *H02K 21/22* (2013.01);
(Continued)

(58) Field of Classification Search
CPC ...... H02K 1/2791; H02K 1/2792; H02K 1/28; H02K 21/222; H02K 21/227; H02K 15/03
(Continued)

(56) References Cited

U.S. PATENT DOCUMENTS 4,012,651 A * 3/1977 Burson ................. H02K 15/03
310/156.19
4,219,752 A * 8/1980 Katou ................. H02K 1/2791
310/156.19
(Continued)

FOREIGN PATENT DOCUMENTS

CN       108429372 A  *  8/2018   ........... H02K 1/2786
WO  WO-2020000698 A1 *  1/2020   ............... H02K 1/27

OTHER PUBLICATIONS

Translation of WO 2020000698 A1 (Year: 2020).*
Translation of CN 108429372 A (Year: 2018).*

*Primary Examiner* — Thomas Truong
*Assistant Examiner* — Daniel K Schlak
(74) *Attorney, Agent, or Firm* — Muncy, Geissler, Olds & Lowe, P.C.

(57) ABSTRACT

An external rotor structure used in a motor structure is made of lightweight and low-cost polymer plastic material and provides good heat convection to provide vehicle cooling. The external rotor structure has a ring-shaped yoke iron part, a ring-shaped magnet part and a plastic part. Thus, by using a design of covering the ring-shaped yoke iron part and the ring-shaped magnet part with polymer plastic material by in-mold injection, it achieves the smooth operation and balance of the motor structure. Combined with through holes in the polymer plastic, the heat generated during the operation of the motor structure can be smoothly discharged to the outside, and the temperature difference between the inside and the outside caused by the operation of the motor structure can be balanced by heat convection. In short, the external rotor structure has advantages of lightweight and low cost.

3 Claims, 21 Drawing Sheets

(51) Int. Cl.
    *H02K 9/04*     (2006.01)
    *H02K 11/33*     (2016.01)
    *H02K 15/03*     (2006.01)
    *H02K 21/22*     (2006.01)

(52) U.S. Cl.
    CPC ............. *H02K 21/222* (2013.01); *H02K 1/28* (2013.01); *H02K 9/04* (2013.01); *H02K 21/227* (2013.01); *H02K 2211/03* (2013.01)

(58) Field of Classification Search
    USPC .................................................. 310/156.23
    See application file for complete search history.

(56) References Cited

U.S. PATENT DOCUMENTS

| | | | | |
|---|---|---|---|---|
| 4,227,105 | A * | 10/1980 | Kumakura | H02K 21/145 310/70 R |
| 4,423,345 | A * | 12/1983 | Nilsson | H02K 15/03 310/156.31 |
| 5,604,412 | A * | 2/1997 | Okada | H02P 6/24 318/434 |
| 2002/0033647 | A1* | 3/2002 | Uemura | H02K 1/2791 310/52 |
| 2002/0158532 | A1* | 10/2002 | Uemura | H02K 15/03 310/74 |
| 2006/0103252 | A1* | 5/2006 | Yokota | H02K 21/222 310/74 |
| 2006/0119204 | A1* | 6/2006 | Awazu | H02K 1/2791 310/156.53 |
| 2007/0132323 | A1* | 6/2007 | Park | H02K 15/0012 310/43 |
| 2007/0163306 | A1* | 7/2007 | Kim | D06F 37/304 68/140 |
| 2008/0169719 | A1* | 7/2008 | Yu | H02K 1/17 310/156.08 |
| 2009/0079276 | A1* | 3/2009 | Ueda | F25B 9/14 310/28 |
| 2010/0133927 | A1* | 6/2010 | Zhang | H02K 1/30 310/43 |
| 2013/0082579 | A1* | 4/2013 | Bailey | D06F 37/304 310/75 R |
| 2013/0091902 | A1* | 4/2013 | Hill | H02K 5/04 310/43 |
| 2013/0207499 | A1* | 8/2013 | Rhee | G11B 19/2009 310/156.12 |
| 2013/0328432 | A1* | 12/2013 | Hoemann | H02K 1/279 310/156.12 |
| 2016/0211728 | A1* | 7/2016 | Yin | H02K 11/33 |
| 2017/0070107 | A1* | 3/2017 | Lee | H02K 1/2791 |
| 2018/0248449 | A1* | 8/2018 | Iwanaga | H02K 29/08 |
| 2019/0028005 | A1* | 1/2019 | Ishizaki | H02K 3/28 |
| 2020/0028420 | A1* | 1/2020 | Kameyama | H02K 21/22 |
| 2020/0153322 | A1* | 5/2020 | Suda | H02K 15/12 |
| 2020/0169134 | A1* | 5/2020 | Kim | H02K 1/276 |
| 2020/0177036 | A1* | 6/2020 | Yokoyama | H02K 1/274 |
| 2021/0167646 | A1* | 6/2021 | Park | H02K 21/22 |
| 2023/0231450 | A1* | 7/2023 | Takayama | H02K 15/03 310/156.01 |

* cited by examiner

MOTOR STRUCTURE

TECHNICAL FIELD

The present disclosure relates to an external rotor structure and a motor structure, and particularly to, an external rotor structure and a motor structure using the external rotor structure which is made of lightweight and low-cost polymer plastic material and provides good heat convection to provide vehicle cooling.

RELATED ART

The motor structure is a device that converts electrical energy into mechanical energy and utilizes the generated mechanical energy to generate kinetic energy to drive vehicles or devices. Regarding the external rotor motor in the known motor structure, the stator is installed in the metal shell of the external rotor, and the magnets are disposed corresponding to the inner wall of the metal shell and the stator. However, the metal shell has a fast heat conduction speed and heat storage, so it is easy to cause a large temperature difference between the inside and outside of the external rotor motor, resulting in the bad convection and bad dissipate heat, and the use of a metal shell will increase the weight of the motor structure. Furthermore, the conventional motor structure assembly methods are mostly assembled by locking, welding and gluing, but such assembly procedures are too cumbersome and time-consuming, making the labor cost and production cost of motor manufacturing remain high, and it is not easy to reduce the motor manufacturing cost.

The stator or rotor in the motor structure is usually installed with a copper coil. The copper coil has a certain resistance value, and the conventional method of soldering the copper coil and the circuit board by using a tin process causes the problem of an increase in the resistance of the entire electronic device. Therefore, after powered on, before the electrical energy is converted into magnetic energy, part of the electrical energy will be lost due to resistance and continue to be dissipated in the form of heat, causing the internal temperature of the motor structure to rise, and when the heat is transferred to the coil of the motor structure, it is easy to cause short-circuit damage to the coil due to the damage of the polymer material of the outer layer of the enameled wire, which in turn leads to damage to the motor structure.

Therefore, how to effectively balance the internal and external temperature differences caused by the operation of the motor structure by innovative hardware design, then to achieve lightness of weight of the motor structure or external rotor structure, to save the assembly process and reduce the manufacturing cost and other advantages, and to avoid the problem of increasing the resistance of the overall electronic device inside the motor structure caused by the conventional tin process, is an important issue that developers and researchers in related industries such as motor structure or external rotor structure need to continue to work hard to overcome and solve.

SUMMARY

An objective of the present disclosure is to provide an external rotor structure which is made of lightweight and low-cost polymer plastic material, and the motor structure of the present disclosure uses a pin slotting manner to connect the circuit board and the coil rather than the conventional tin process, so as to avoid the problem of increasing the resistance of the overall electronic device caused by the conventional tin process.

To achieve the objective of the present disclosure, the present disclosure provides an external rotor structure, the external rotor structure comprises a ring-shaped yoke iron part, a ring-shaped magnet part and a plastic part. Multiple magnets are arranged at intervals in an inner side portion of the ring-shaped yoke iron part to form the ring-shaped magnet part, wherein the two adjacent magnets have a first spacing therebetween. The plastic part covers an outer side portion of the ring-shaped yoke iron part and is filled into the first spacing.

According to an embodiment of the present disclosure, an upper surface of the ring-shaped magnet part is disposed coplanar to a side portion of the ring-shaped yoke iron part, and a lower surface of the ring-shaped magnet part is disposed coplanar to a lower side portion of the ring-shaped yoke iron part.

According to an embodiment of the present disclosure, one corner of two ends of the magnet is disposed with a bevel and the bevel is covered by the plastic part.

According to an embodiment of the present disclosure, the plastic part at least comprises a top portion, a side portion and a filling portion, wherein the top portion is disposed to mask the upper side portion of the ring-shaped yoke iron part, the side portion is disposed to surround the outer side portion of the ring-shaped yoke iron part, and the filling portion is filled into each first spacing of each of the adjacent magnets.

According to an embodiment of the present disclosure, an inner surface of the ring-shaped magnet part being far away from the ring-shaped yoke iron part is coplanar to an inner surface of the filling portion being far away from the ring-shaped yoke iron part.

According to an embodiment of the present disclosure, the top portion at least comprises an upper top portion and a side top portion, the side top portion is disposed to surround a perimeter edge of the upper top portion, and the side top portion is formed with a stair structure.

According to an embodiment of the present disclosure, the upper top portion is disposed with multiple ribs being arranged at intervals, each of the ribs has a Y shape, and the ribs are radially extending and branched from a center portion of the upper top portion to the side top portion.

According to an embodiment of the present disclosure, the side top portion is disposed to have through holes which penetrate the top portion, wherein one side of the through hole is disposed with a baffle.

To achieve the objective of the present disclosure, the present disclosure provides a motor structure at least comprising the external rotor structure mentioned above, a buckle part and an internal stator. The external rotor structure covers the buckle part and the internal stator is disposed in an accommodating space between the external rotor structure and the buckle part.

According to an embodiment of the present disclosure, the buckle part at least comprises a shaft, an upper cover, a lower cover and a circuit board, the shaft is protruding from the upper cover, and the lower cover and the upper cover are connected to each other by at least one fastener part, the circuit board is disposed between the upper cover and the lower cover, and a connection terminal is disposed to protrude from the circuit board.

According to an embodiment of the present disclosure, the circuit board at least comprises an electronic component and at least a connection part thereon, and the connection part is used to electrically connect the electronic component with the circuit board in a solderless manner.

According to an embodiment of the present disclosure, the internal stator at least comprises a stator, a first insulating sleeve, a tie strap and a second insulating sleeve, wherein the stator is formed by stacking multiple silicon steel sheets, at least an enameled wire is twined on the silicon steel sheets, a center position of the stator comprises a hollow part which the shaft is sleeved to, the tie strap is sleeved to the shaft, and the tie strap has annular grooves being surrounded by the tie strap, such that the tie strap being sleeved to the shaft contacts the silicon steel sheets, and the stator is fixed to the shaft.

According to an embodiment of the present disclosure, the first insulating sleeve and the second insulating sleeve respectively cover two ends of the stator, the first insulating sleeve has a least a slot, and the slot is plugged with a pin, wherein the enameled wire twines between the pin and the slot, and the pin and the enameled wire have a non-vertical angle therebetween.

According to an embodiment of the present disclosure, the pin is disposed with multiple grooves, and a width of the groove is less than a wire diameter of the enameled wire.

To sum up, the external rotor structure and the motor structure of the present disclosure adopt the hardware design of covering the ring-shaped yoke iron part and the ring-shaped magnet part with polymer plastic material by in-mold injection, and it achieves the smooth operation and balance of the motor structure since the polymer plastic material is lightweight. Combined with through holes in the polymer plastic, the heat generated during the operation of the motor structure can be smoothly discharged to the outside, and the temperature difference between the inside and the outside caused by the operation of the motor structure can be balanced by heat convection. Through the application of polymer plastic material, the motor structure has advantages of lightweight and cost reduction.

DETAILS OF EMBODIMENTS

To understand the technical features, content and advantages of the present disclosure and its efficacy, the present disclosure will be described in detail with reference to the accompanying drawings. The drawings are for illustrative and auxiliary purposes only and may not necessarily be the true scale and precise configuration of the present disclosure. Therefore, the scope of the present disclosure should not be limited to the scale and configuration of the attached drawings.

Figure 1A:
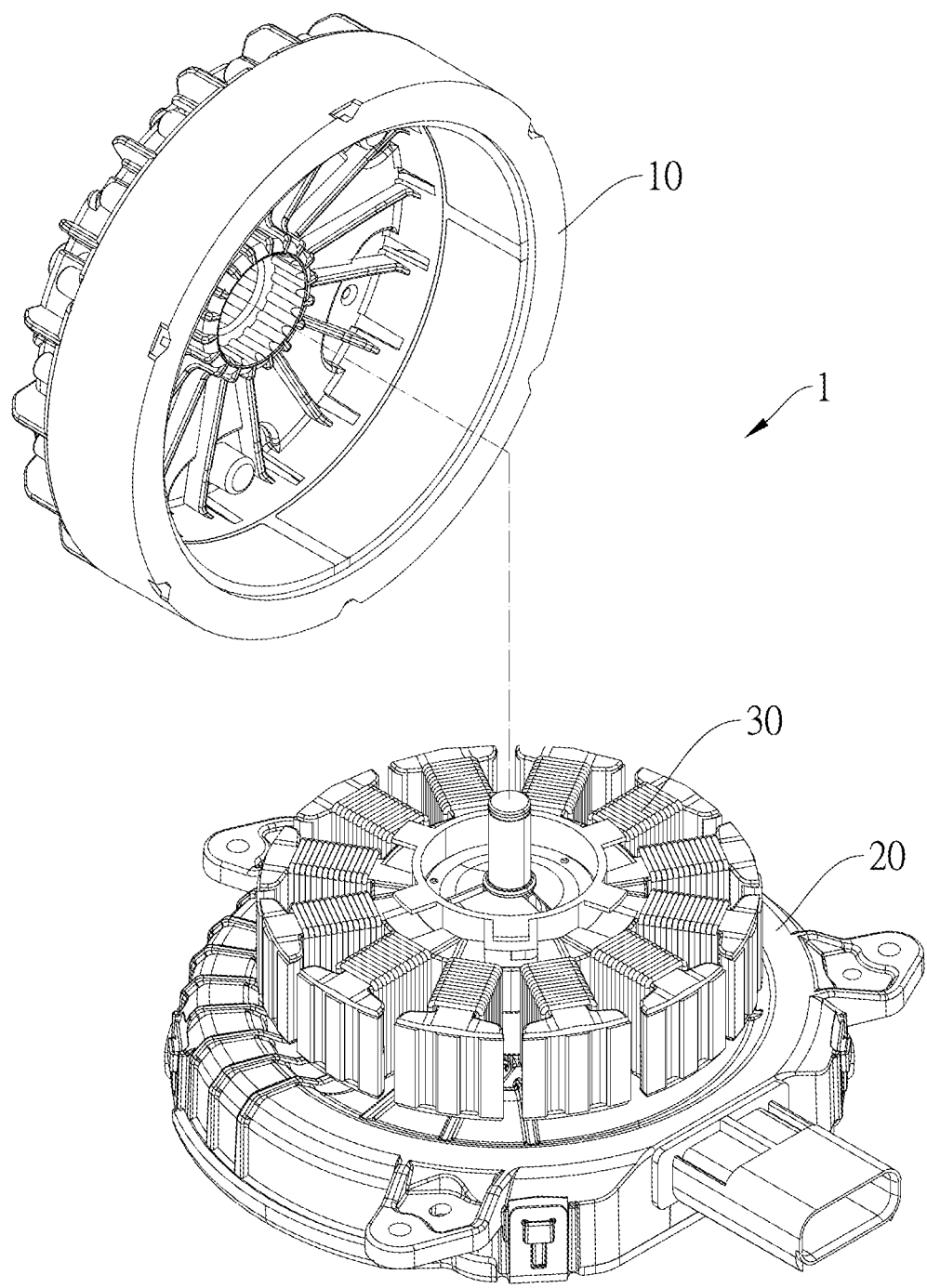
FIG. 1A is a first schematic diagram of an external rotor structure according to a first embodiment of the present disclosure.
Figure 1B:
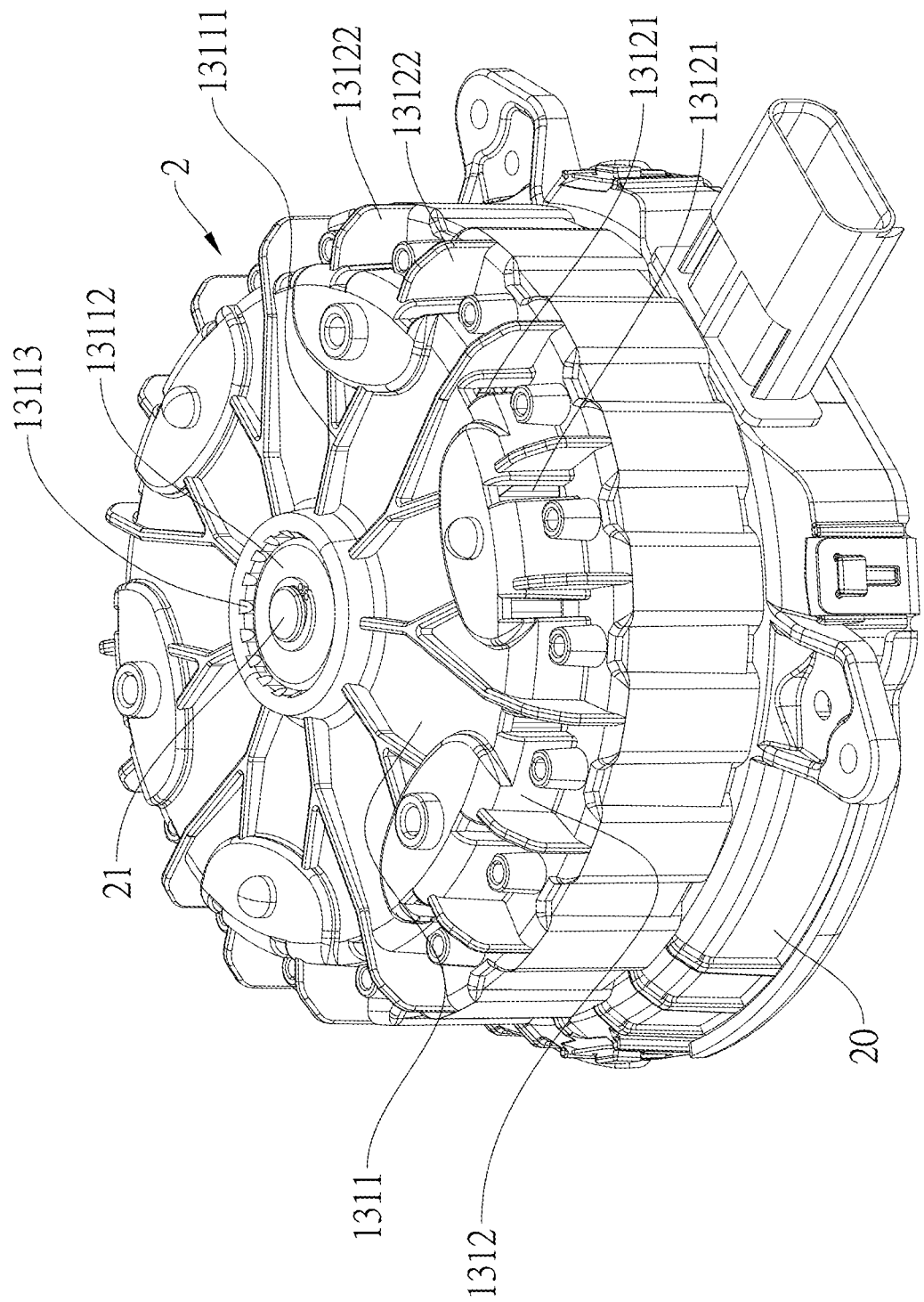
FIG. 1B is a second schematic diagram of an external rotor structure according to a first embodiment of the present disclosure.
Figure 2:
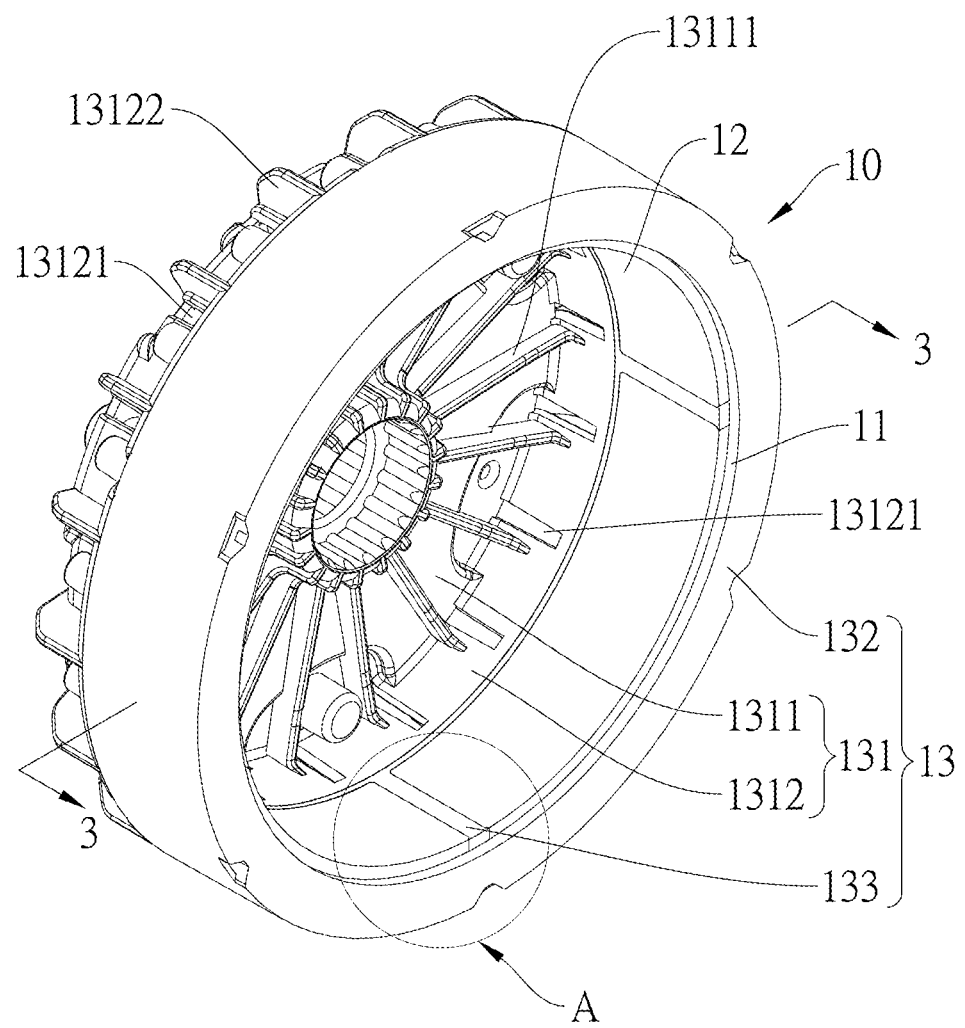
FIG. 2 is a side view of a whole structure of an external rotor structure according to a first embodiment of the present disclosure.
Figure 3:
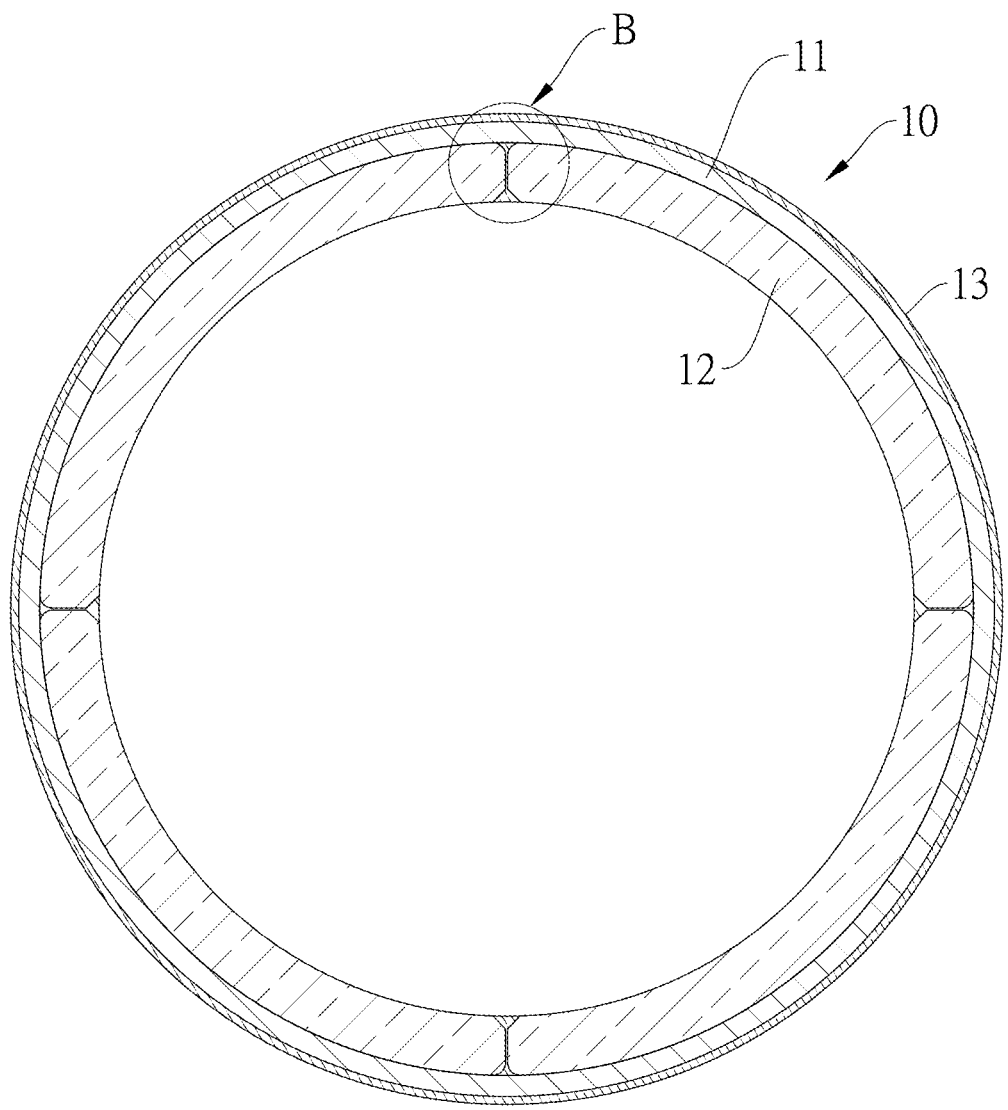
FIG. 3 is a bottom view of a whole structure of an external rotor structure according to a first embodiment of the present disclosure.
Figure 4:
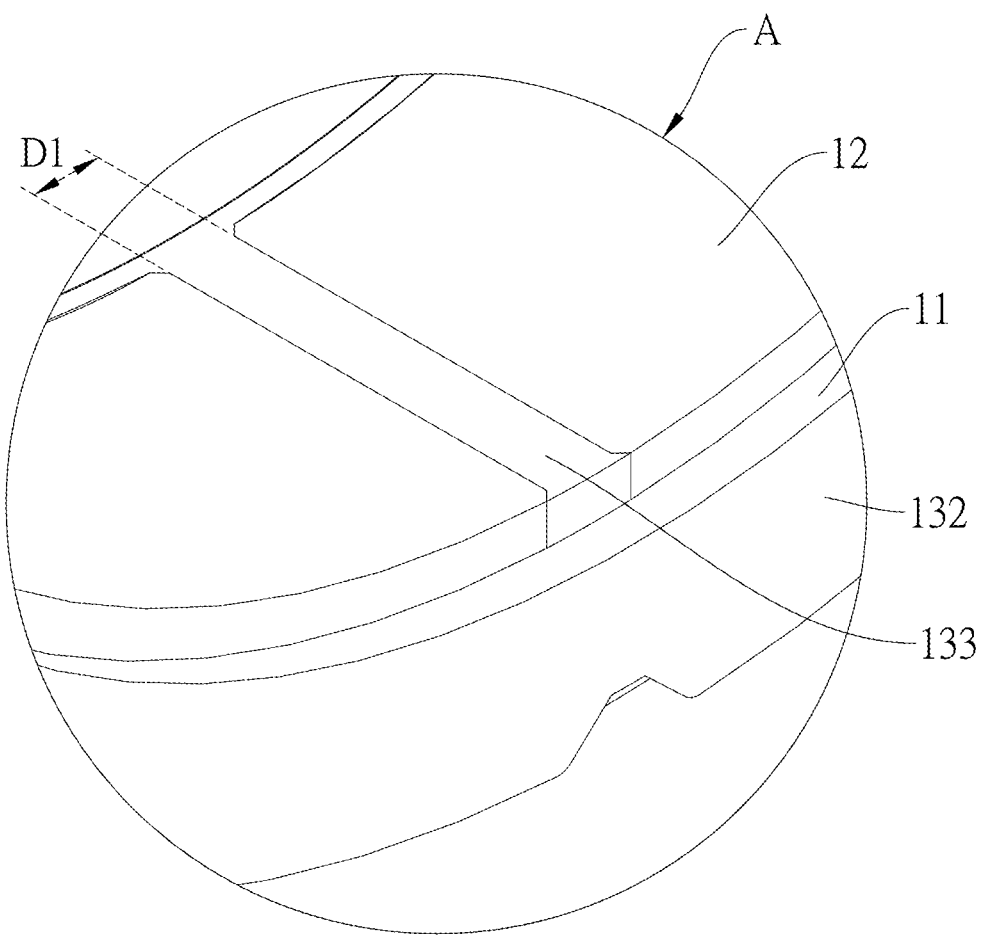
FIG. 4 is a first enlarged view of a partial structure of an external rotor structure according to a first embodiment of the present disclosure.
Figure 5:
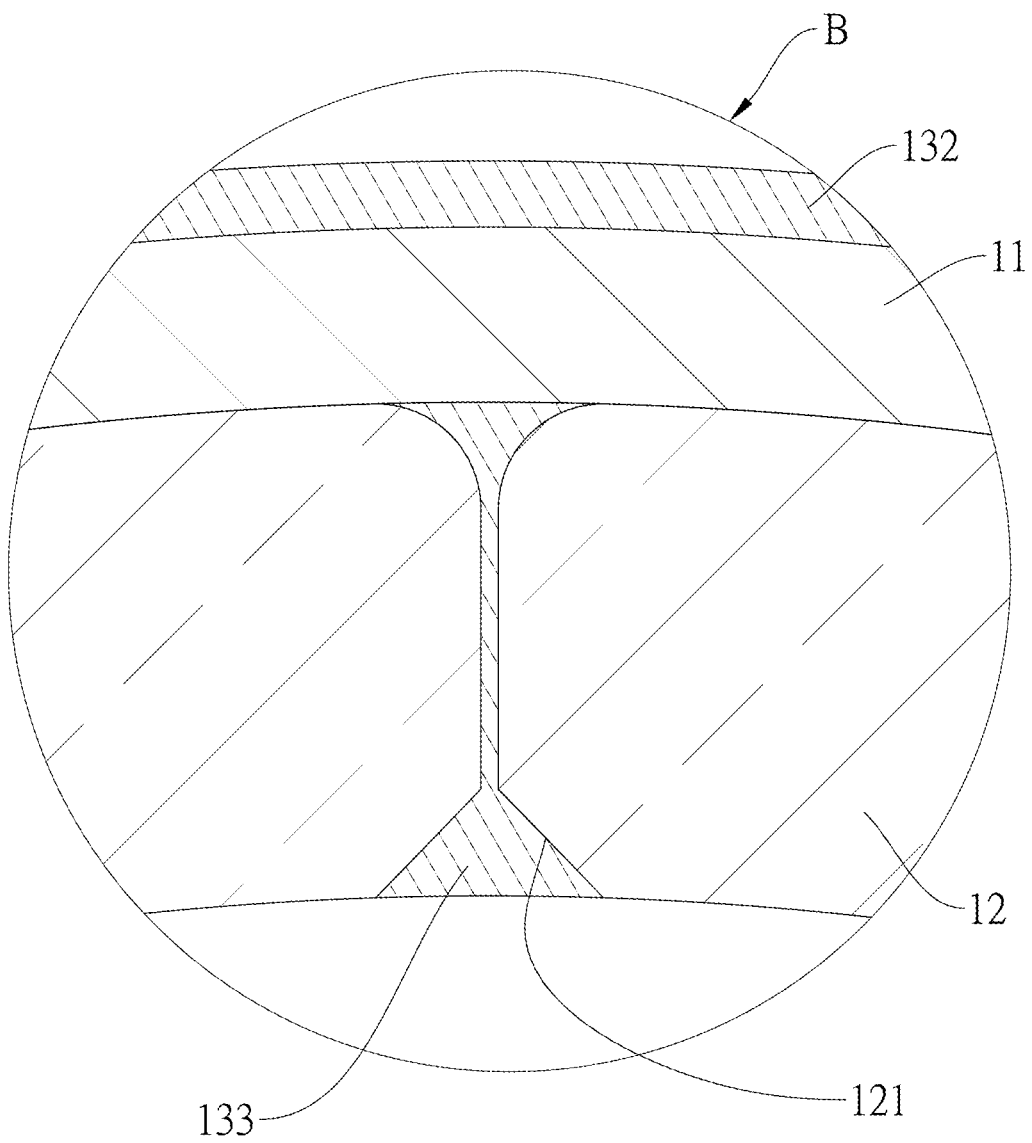
FIG. 5 is a second enlarged view of a partial structure of an external rotor structure according to a first embodiment of the present disclosure.

Firstly, refer to FIG. 1A to FIG. 5, FIG. 1A is a first schematic diagram of an external rotor structure according to a first embodiment of the present disclosure, FIG. 1B is a second schematic diagram of an external rotor structure according to a first embodiment of the present disclosure, FIG. 2 is a side view of a whole structure of an external rotor structure according to a first embodiment of the present disclosure, FIG. 3 is a bottom view of a whole structure of an external rotor structure according to a first embodiment of the present disclosure, FIG. 4 is a first enlarged view of a partial structure of an external rotor structure according to a first embodiment of the present disclosure, and FIG. 5 is a second enlarged view of a partial structure of an external rotor structure according to a first embodiment of the present disclosure, wherein FIG. 4 is the enlarged view of a part A in FIG. 2, and FIG. 5 is an enlarged view of a part B in FIG. 3. The external rotor structure (10) at least comprises a ring-shaped yoke iron part (11), a ring-shaped magnet part (12) and a plastic part (13). The external rotor structure (10)

covers a buckle part (20), and an internal stator (30) is disposed in an accommodating space between the external rotor structure (10) and the buckle part (20), so as to form a motor structure (1). Accordingly, the external rotor structure and its assembly method of the present disclosure adopts the hardware design of covering the ring-shaped yoke iron part (11) and the ring-shaped magnet part (12) with polymer plastic material by in-mold injection, the smooth operation and balance of the motor structure (1) can be achieved since the polymer plastic material is lightweight. Combined with through holes in the polymer plastic, the heat generated during the operation of the motor structure (1) can be smoothly discharged to the outside, and the temperature difference between the inside and the outside caused by the operation of the motor structure can be balanced by heat convection. Through the application of polymer plastic material, the motor structure (1) has advantages of lightweight and cost reduction.

The ring-shaped yoke iron part (11) can be implemented by a single one yoke iron or by multiple yoke irons. In one preferred embodiment, the single one yoke iron has a ring shape to form the ring-shaped yoke iron part (11) without any connection seam. Additionally, in another preferred embodiment, one end (such as, a head end) of the ring-shaped yoke iron part (11) and other one end (such as, a tail end) have a second spacing (not shown in the drawings) therebetween. Further, in other one embodiment, the ring-shaped yoke iron part (11) of the external rotor structure (10) is formed by the plurality of yoke irons, for example, the ring-shaped yoke iron part (11) is formed by four arcuated yoke irons, wherein one end of one of the yoke irons and one end of the adjacent yoke iron have a second spacing therebetween. Moreover, one end of the yoke iron has a first convex part (not shown in drawings), and other one end of the yoke iron has a first recess part (not shown in drawings) which can be fixed to the first convex part, wherein the second spacing is formed between the first convex part and the yoke iron and the first recess part of the adjacent yoke iron.

The ring-shaped magnet part (12) is formed by multiple magnets, and the magnets are arranged at intervals in an inner side portion of the ring-shaped yoke iron part (11) to form the ring-shaped magnet part (12), wherein the two adjacent magnets have a first spacing (D1) therebetween. That is, in one embodiment, four arcuated magnets are arranged at intervals in an inner side portion of the ring-shaped yoke iron part (11) to form the ring-shaped magnet part (12), and the two adjacent arcuated magnets have the first spacing (D1) therebetween. An upper surface of the ring-shaped magnet part (12) is disposed coplanar to a side portion of the ring-shaped yoke iron part (11), and a lower surface of the ring-shaped magnet part (12) is disposed coplanar to a lower side portion of the ring-shaped yoke iron part (11).

The plastic part (13) covers an outer side portion of the ring-shaped yoke iron part (11) and is filled into the first spacing (D1). When implementing the embodiment of the present disclosure, the first spacing (D1) can be larger than or equal to 0.1 cm and less than or equal 1 cm, i.e. $0.1 \text{ cm} \leq D1 \leq 1 \text{ cm}$, and preferably, 0.25 cm, thus making the plastic part (13) be able to cover the ring-shaped yoke iron part (11) and the ring-shaped magnet part (12). A surface of the ring-shaped magnet part (12) being far away from the ring-shaped yoke iron part (11) is exposed to the plastic part (13), and that is, the inner surface of the ring-shaped magnet part (12) is not covered by the plastic part (13). Moreover, corner of the two ends (such as, a head end and a tail end) of the magnet are disposed with bevels (121) and the bevel (121) is covered by the plastic part (13). Further, the plastic part (13) at least comprises a top portion (131), a side portion (132) and a filling portion (133), wherein the top portion (131) is disposed to mask the upper side portion of the ring-shaped yoke iron part (11), the side portion (132) is disposed to surround the outer side portion of the ring-shaped yoke iron part (11), and the filling portion (133) is filled into each first spacing (D1) of each of the adjacent magnets. An inner surface of the ring-shaped magnet part (12) being far away from the ring-shaped yoke iron part (11) is coplanar to an inner surface of the filling portion (133) being far away from the ring-shaped yoke iron part (11). In an actual implemented embodiment, the filling portion (133) is filled into the first spacing (D1) of the ring-shaped magnet part (12) and the second spacing of the ring-shaped yoke iron part (11), and the whole thickness is 1 cm to 3 cm (comprising the two end points), thus effectively realizing the application of plastic casing motors and achieving objectives of lightweight and reduce manufacturing costs. However, it is noted that, the number of the yoke irons to form the ring-shaped yoke iron part (11) and the number of the magnets to form the ring-shaped magnet part (12) are not limited to the above numbers, and the above numbers are just to explain one of embodiments. The number of the yoke irons to form the ring-shaped yoke iron part (11) and the number of the magnets to form the ring-shaped magnet part (12) can determined according to the demanded tightness of bonding and connection of the magnets and the yoke irons, which is not used to affect the implementation of the present disclosure. It is noted that, the plastic part (13) is made by an in-mold injection process, so the plastic part (13) is integrally formed.

Further, refer to FIG. 1B and FIG. 2, the top portion (131) at least comprises an upper top portion (1311) and a side top portion (1312), the side top portion (1312) is disposed to surround a perimeter edge of the upper top portion (1311), and the side top portion (1312) is formed with a stair structure. The upper top portion (1311) is disposed with multiple ribs (13111) being arranged at intervals, each of the ribs (13111) preferably has a Y shape, and the ribs (13111) are radially extending and branched from a center portion of the upper top portion (1311) to the side top portion (1312). Therefore, it strengthens the structural strength of the overall external rotor structure (10). The side top portion (1312) is disposed to have through holes (13121) which penetrate the top portion (131), wherein one side of the through hole (13121) is disposed with a baffle (13122). The installation of the through holes (13121) is mainly to achieve the effect of uniform temperature inside and outside of the external rotor structure (10). That is, the heat generated by the internal stator (30) can be dissipated to the outside of the external rotor structure (10) through the through holes (13121). When the external rotor structure (10) rotates, the air outside the external rotor structure (10) can also enter the interior of the external rotor structure (10) from the through hole (13121) through the diversion of the baffle (13122), for cooling action.

Figure 6:
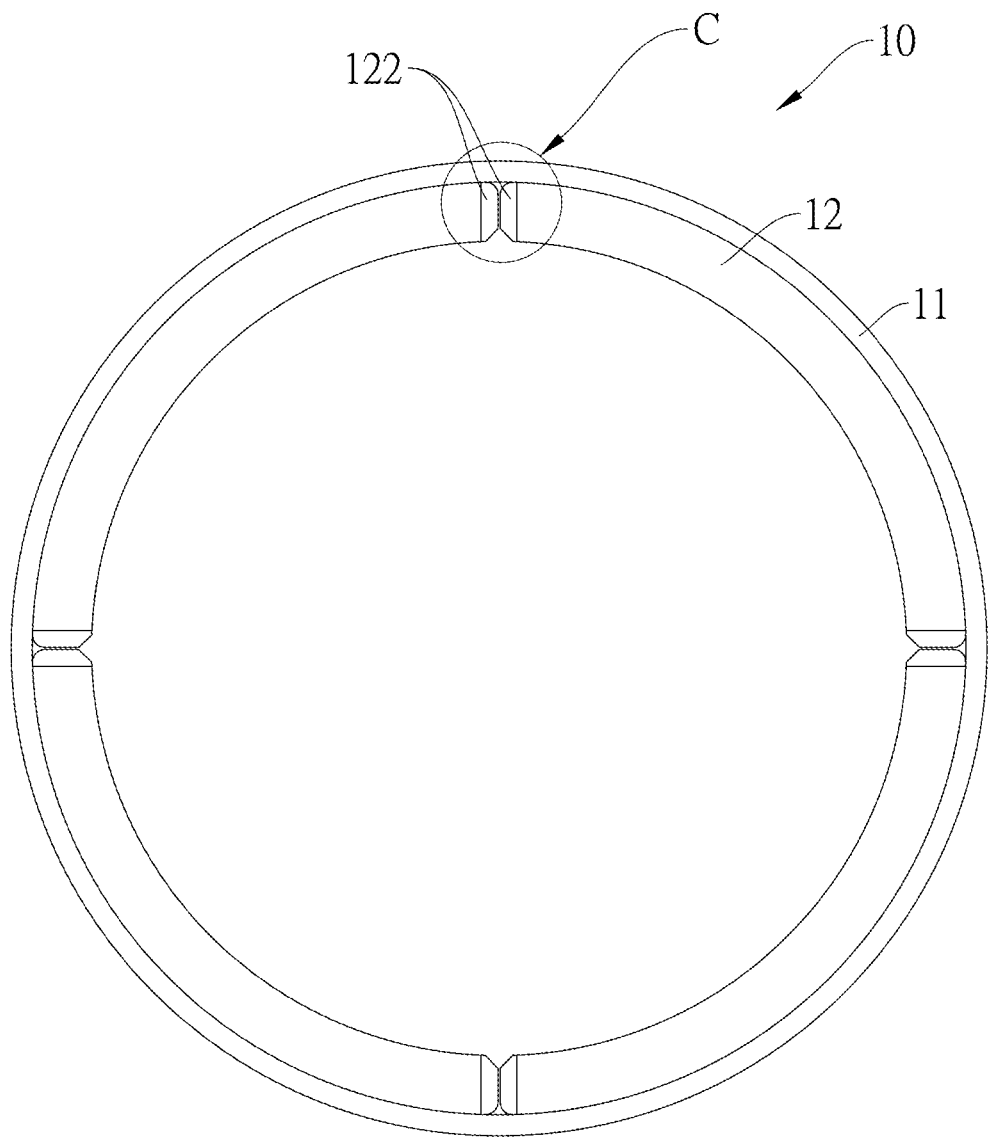
FIG. 6 is a schematic diagram of a structure of a ring-shaped yoke iron of an external rotor structure according to a second embodiment of the present disclosure.
Figure 7:
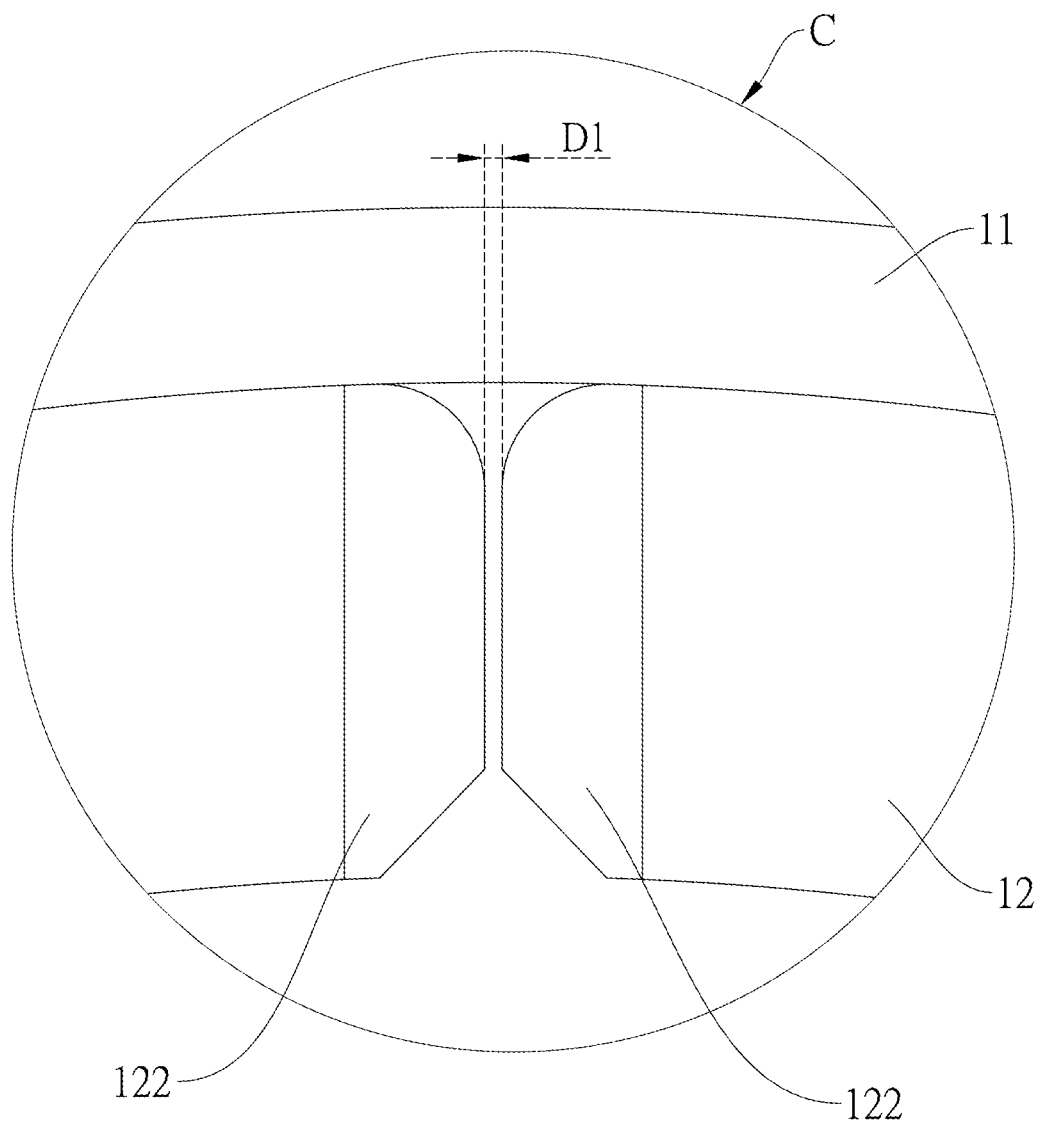
FIG. 7 is an enlarged view of a partial structure of an external rotor structure according to a second embodiment of the present disclosure.
Figure 8:
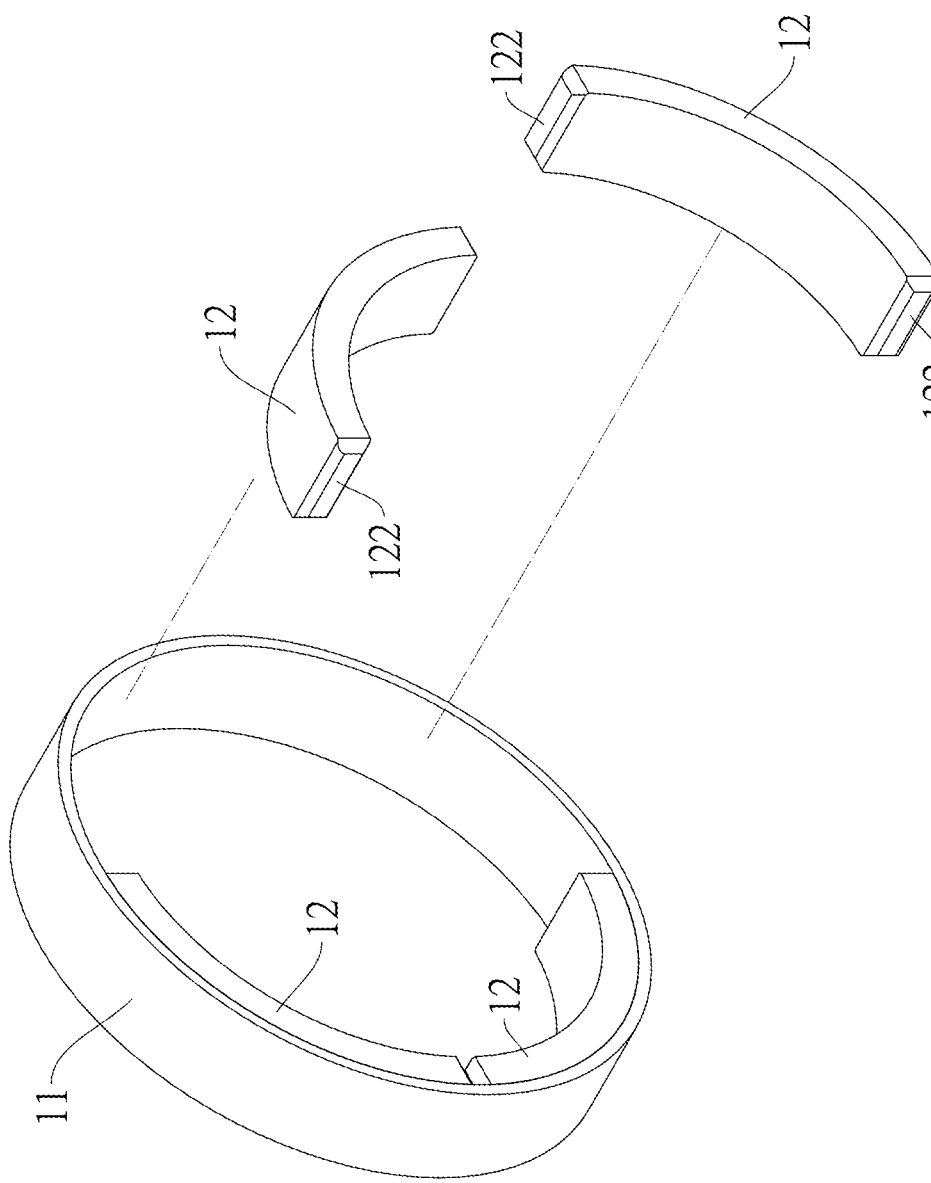
FIG. 8 is an explosive diagram of a whole structure of an external rotor structure according to a second embodiment of the present disclosure.

Further, refer to FIG. 6 to FIG. 8, FIG. 6 is a schematic diagram of a structure of a ring-shaped yoke iron of an external rotor structure according to a second embodiment of the present disclosure, FIG. 7 is an enlarged view of a partial structure of an external rotor structure according to a second embodiment of the present disclosure, and FIG. 8 is an explosive diagram of a whole structure of an external rotor structure according to a second embodiment of the present disclosure. The external rotor structure (10) is formed by the ring-shaped yoke iron part (11) and a ring-shaped magnet part (12), wherein the ring-shaped magnet part (12) is formed by four arcuated magnets, and each of the arcuated magnets has two ends (such as, a head end and a tail end). The two ends of the arcuated magnet are respectively formed with second convex parts (122), the second convex part (122) of the arcuated magnet and the second convex part (122) of the adjacent arcuated magnet have the first spacing (D1) therebetween, and the second convex part (122) is covered by the plastic part (13) while the first spacing (D1) is filled with the plastic part (13).

Figure 9:
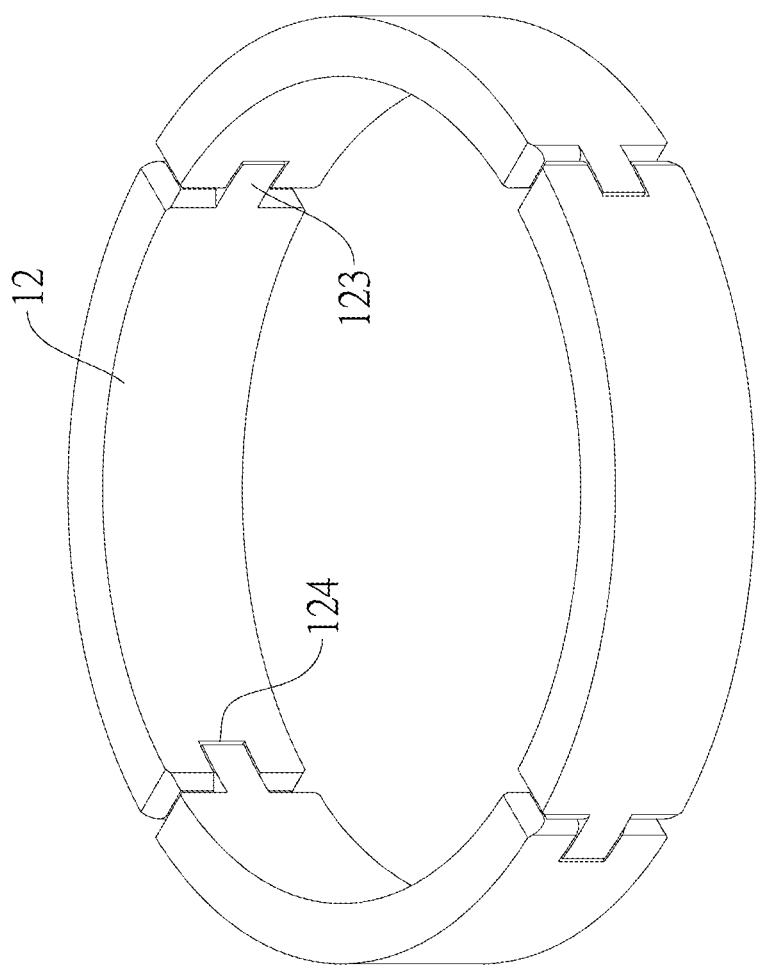
FIG. 9 is a schematic diagram of a ring-shaped magnet part of an external rotor structure according to a third embodiment of the present disclosure.
Figure 10:
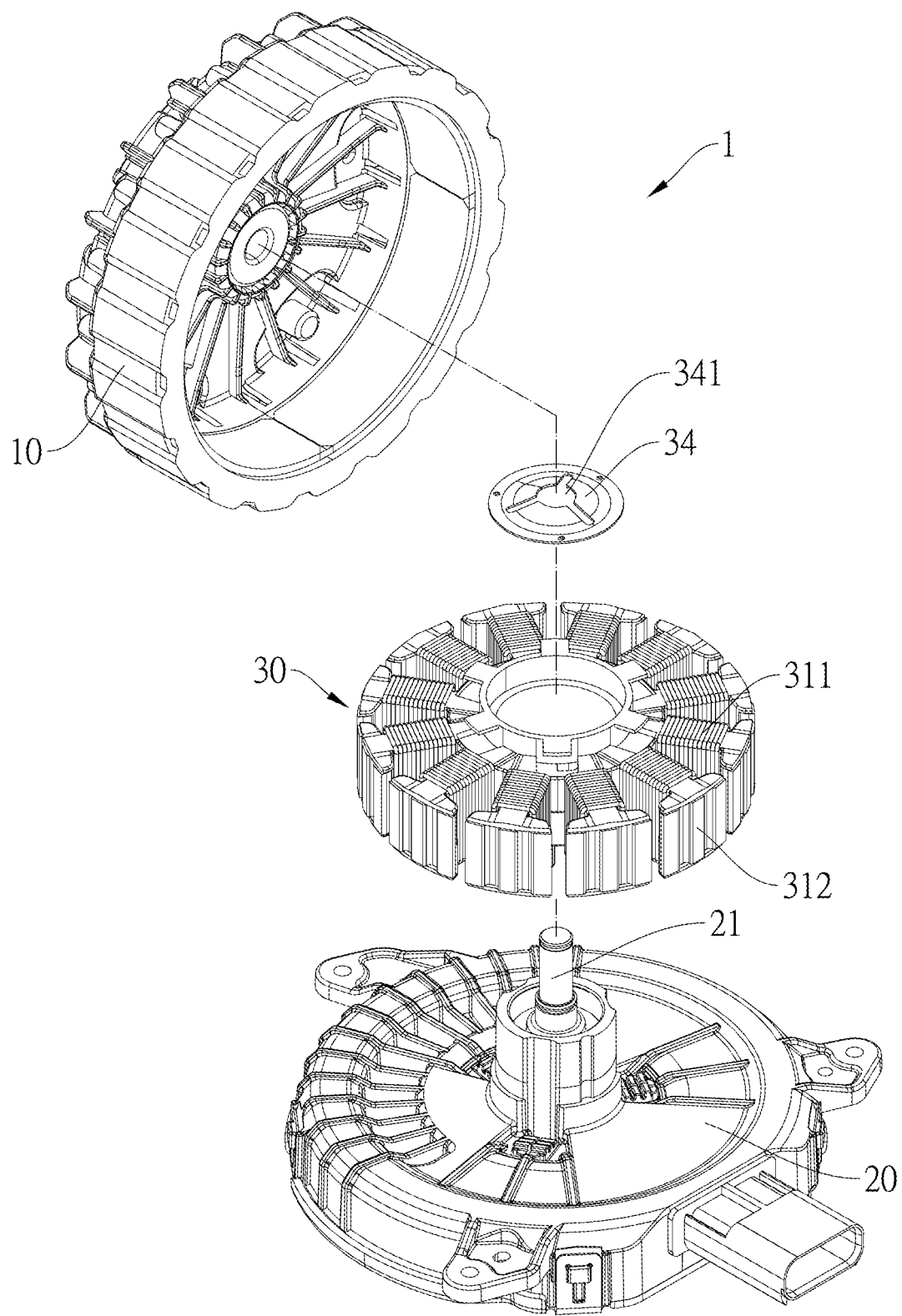
FIG. 10 is an explosive diagram of a whole structure of a motor structure according to an embodiment of the present disclosure.
Figure 11:
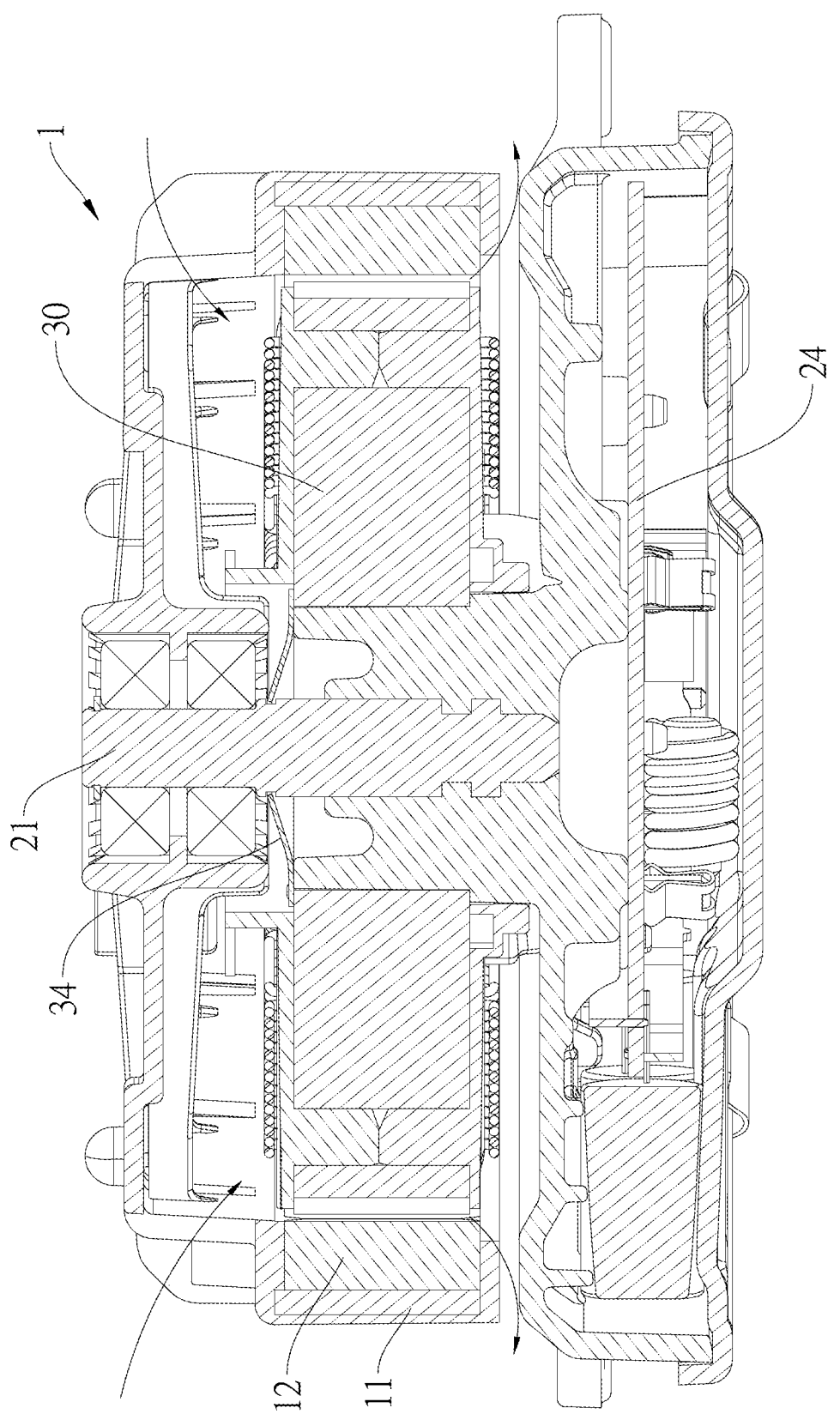
FIG. 11 is a sectional view of a whole structure of a motor structure according to an embodiment of the present disclosure.

Refer to FIG. 9, and FIG. 9 is a schematic diagram of a ring-shaped magnet part of an external rotor structure according to a third embodiment of the present disclosure. One end (such as a head end or a tail end) of the magnet of the ring-shaped magnet part (12) is disposed with a third convex part (123), and the other one end (corresponding to a head end or a tail end) of the magnet of the ring-shaped magnet part (12) is disposed with a second recess part (124). The third convex part (123) of the magnet is fixed to the second recess part (124) of the adjacent magnet. That is, the magnets can be tightly connected and fixed to each other by using the third convex parts (123) and the second recess parts (124).

Figure 12:
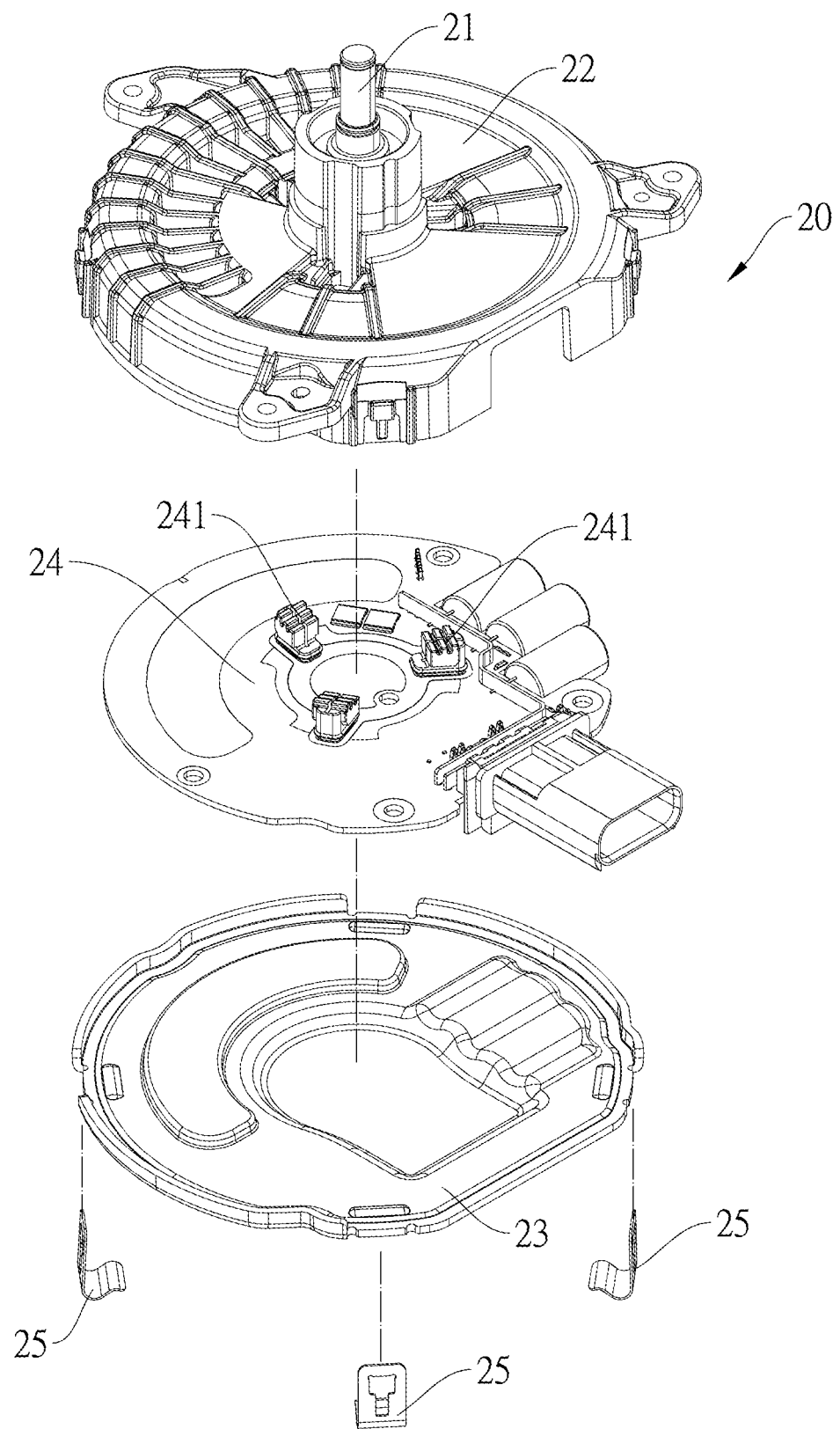
FIG. 12 is an explosive diagram of a buckle part of a motor structure according to an embodiment of the present disclosure.

Refer to FIG. 1B and FIG. 10 to FIG. 12, the motor structure (1) of the present disclosure at least comprises an external rotor structure (10), the buckle part (20) and the internal stator (30). In addition, a center position of the upper top portion (1311) of the external rotor structure (10) has a bearing (13112), and a shaft (21) can penetrate the bearing (13112). Multiple positioning holes (13113) are arranged around the bearing (13112) to achieve the purpose of the external rotor structure (10) rotating around the shaft (21). The buckle part (20) is covered on a terminal end of the side portion (132) being far away the top portion (131), the buckle part (20) and the external rotor structure (10) are surrounded by an accommodating space, and the accommodating space is provided with the shaft (21). That is, as shown in FIG. 12, the buckle part (20) at least comprises a shaft (21), an upper cover (22), a lower cover (23) and a circuit board (24), the shaft (21) is fixed to buckle part (20) and protruding from the upper cover (22), the lower cover (23) and the upper cover (22) are connected to each other by at least one fastener part (25), and for example, three fastener parts (25) are used to make the lower cover (23) and the upper cover (22) connected to each other. the circuit board (24) is disposed between the upper cover (22) and the lower cover (23), and at least a connection terminal (241) is disposed to protrude from the circuit board (24), for example, the three connection terminals (241).

Figure 13:
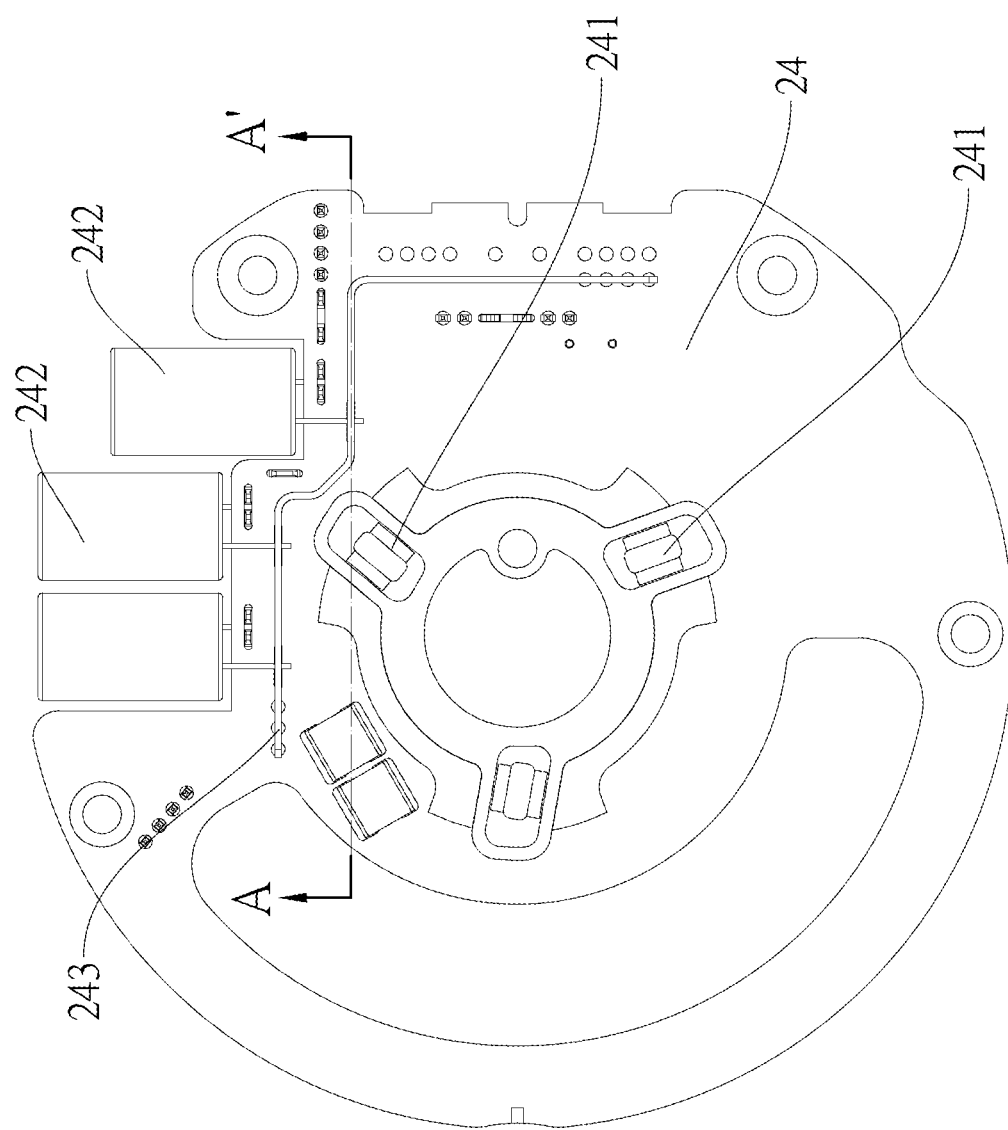
FIG. 13 is a schematic diagram of a configuration of a circuit board of a motor structure according to an embodiment of the present disclosure.
Figure 14:
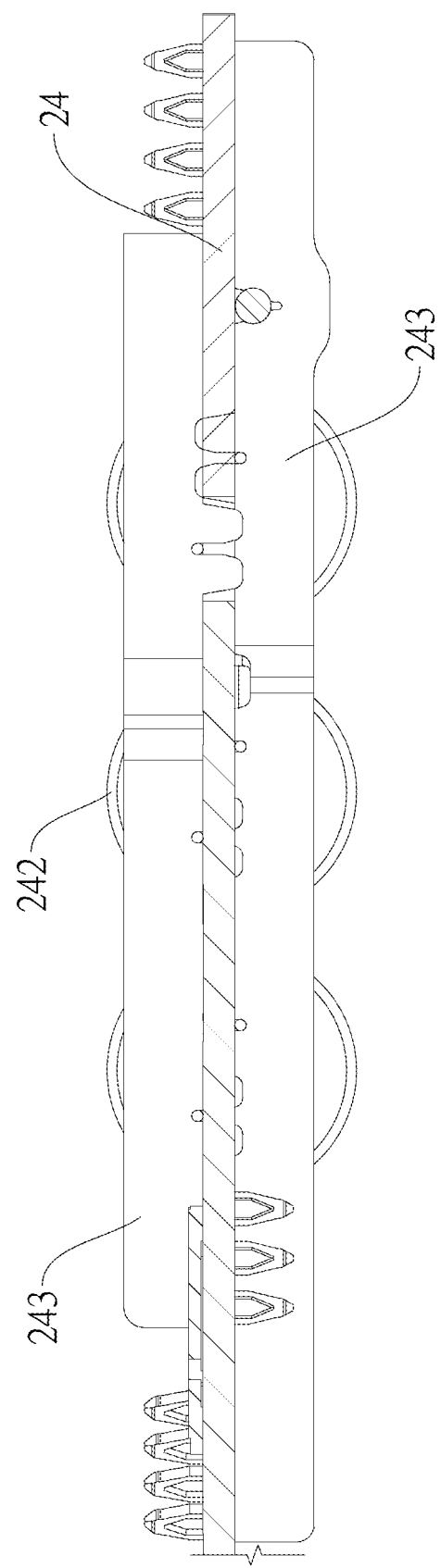
FIG. 14 is a sectional view of a configuration of a circuit board of a motor structure according to an embodiment of the present disclosure.
Figure 15:
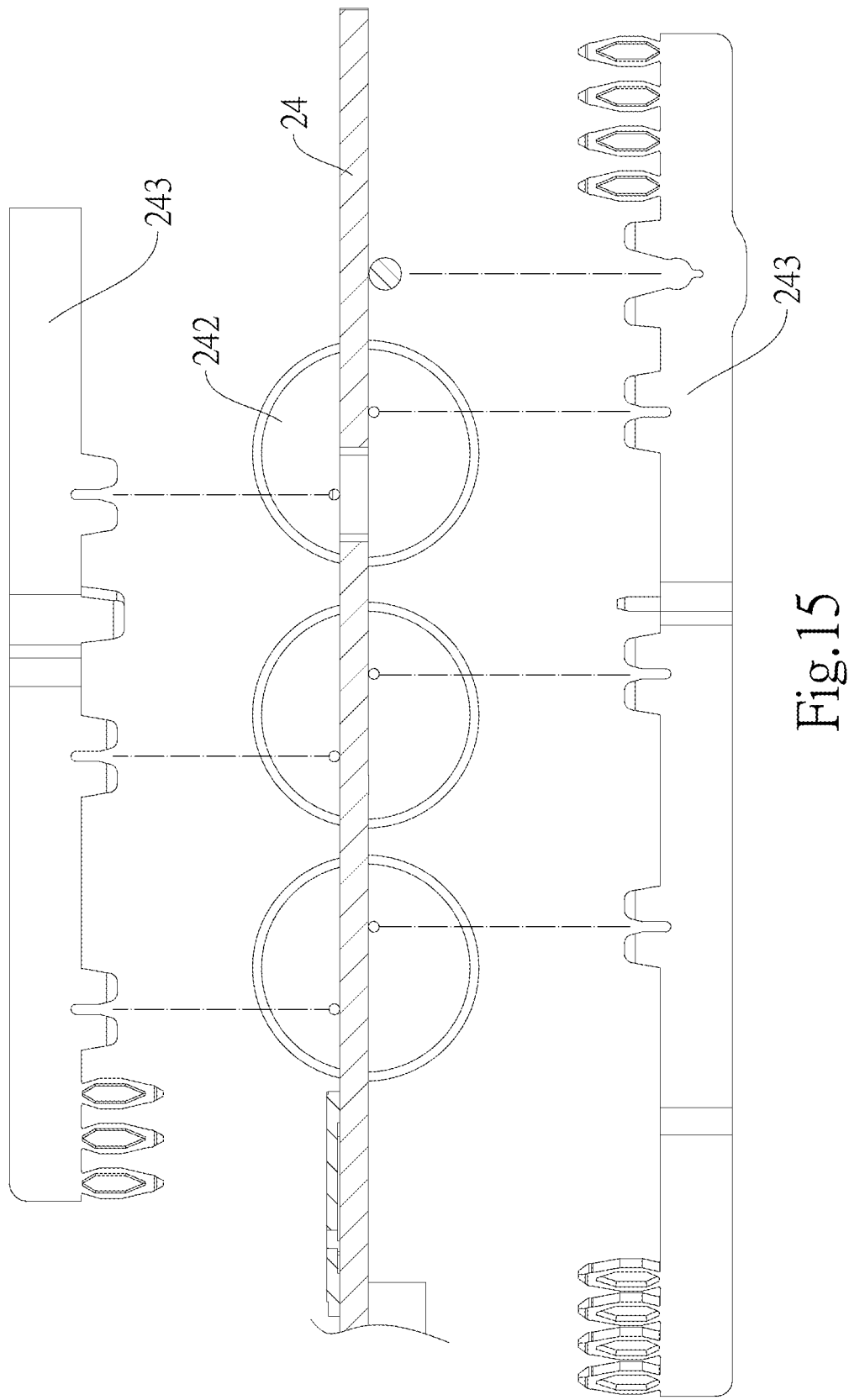
FIG. 15 is an explosive diagram of a configuration of a circuit board of a motor structure according to an embodiment of the present disclosure.
Figure 16:
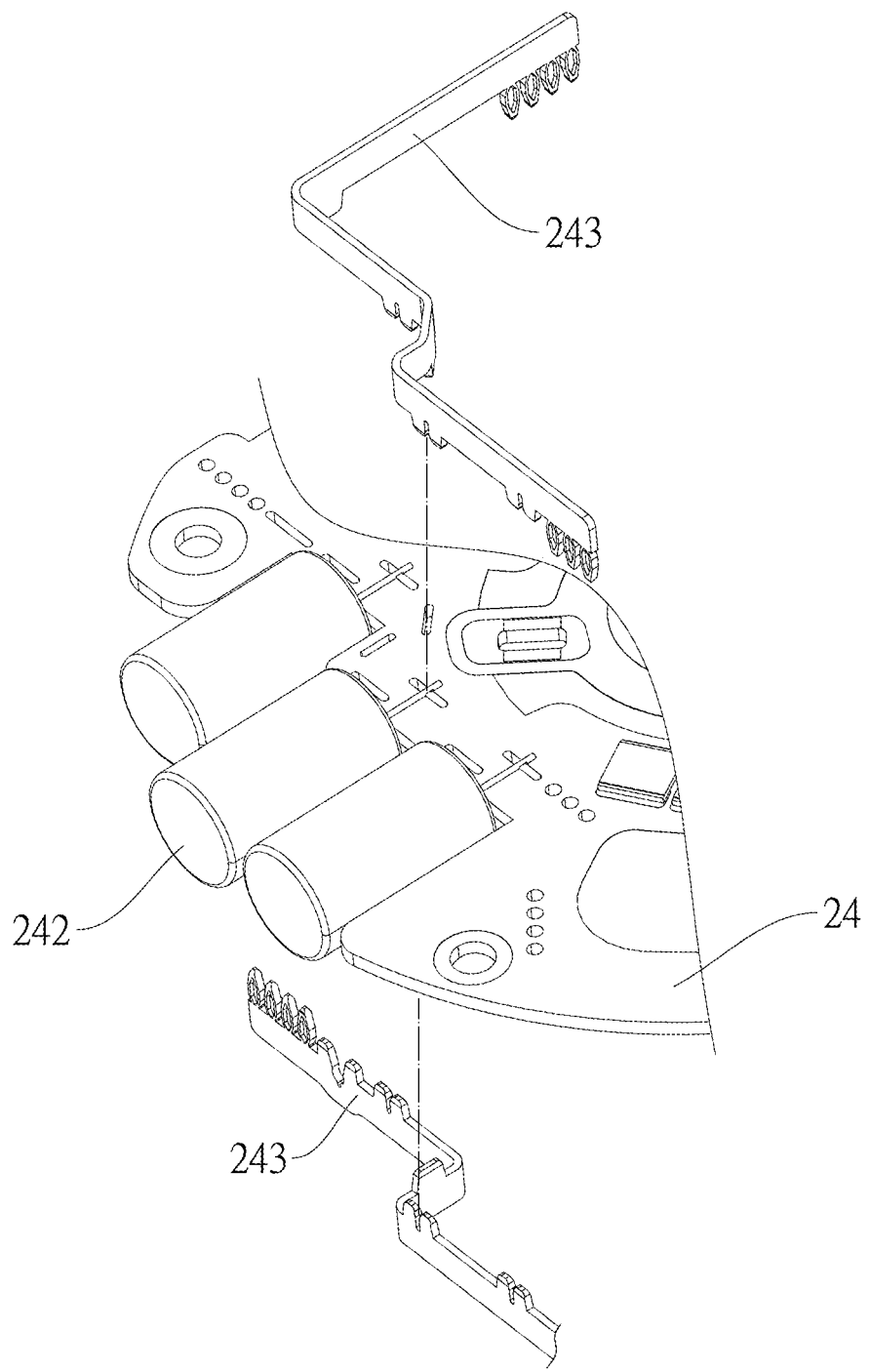
FIG. 16 is an explosive diagram of a configuration of a connection part of a motor structure according to an embodiment of the present disclosure.

Refer to FIG. 13 to FIG. 16, FIG. 13 is a schematic diagram of a configuration of a circuit board of a motor structure according to an embodiment of the present disclosure, FIG. 14 is a sectional view of a configuration of a circuit board of a motor structure according to an embodiment of the present disclosure, FIG. 15 is an explosive diagram of a configuration of a circuit board of a motor structure according to an embodiment of the present disclosure, and IG. 16 is an explosive diagram of a configuration of a connection part of a motor structure according to an embodiment of the present disclosure, wherein FIG. 14 is a sectional view of the section line AA' of FIG. 13. The circuit board (24) comprises at least an electronic component (242) and at least a connection part (243) thereon, the connection part (243) is used to electrically connect the electronic component (242) with the circuit board (24) in a solderless manner, and the circuit board (24) is a printed circuit board assembly (PCBA). The connection part (243) is for pin slotting and used to replace the conventional tin process for connection, thus effectively avoiding the problem of increasing the resistance of the overall electronic device caused by the conventional tin process, and the assembly is also easier. Further, the connection part (243) inserted on the circuit board (24) enables electronic components (242) such as inductors or capacitors to be inserted on the connection part (243) due to an angle design, and because there is no need to use solder, it can reduce time cost and personnel cost.

Figure 17:
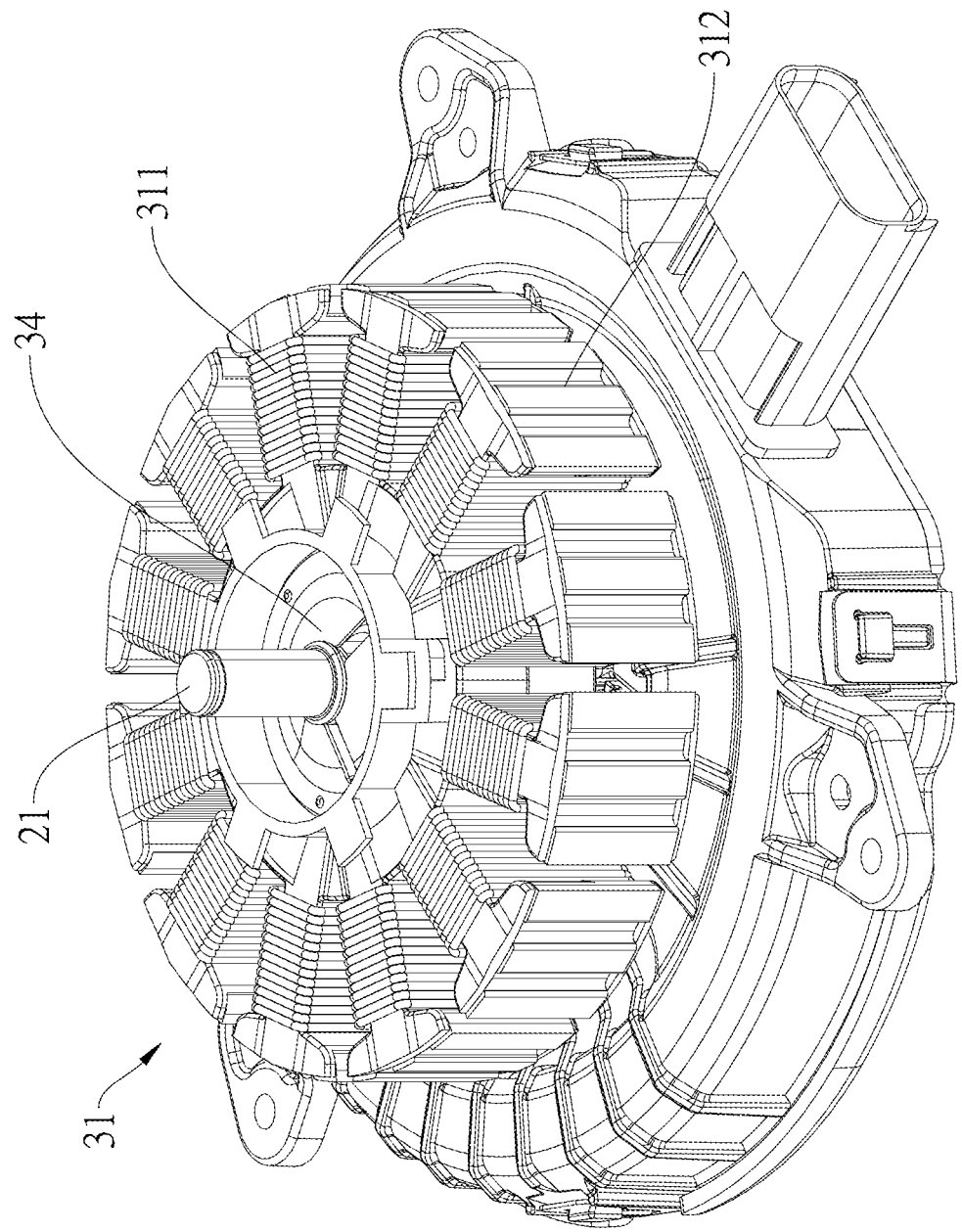
FIG. 17 is a schematic diagram of an internal stator and a buckle part of a motor structure according to an embodiment of the present disclosure.
Figure 18:
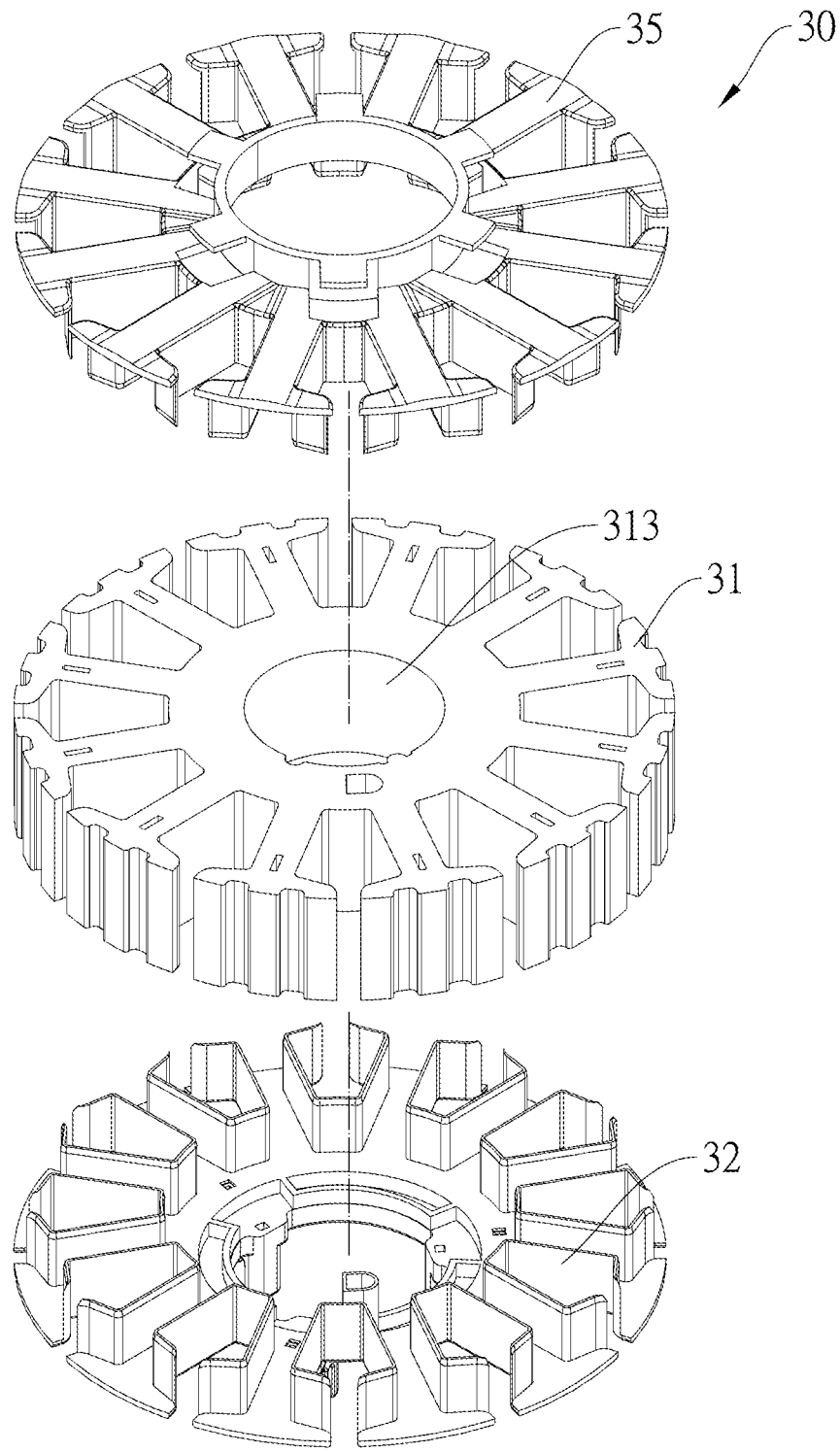
FIG. 18 is an explosive diagram of an internal stator of a motor structure according to an embodiment of the present disclosure.

Refer to FIG. 2, FIG. 17 and FIG. 18, FIG. 17 is a schematic diagram of an internal stator and a buckle part of a motor structure according to an embodiment of the present disclosure, and FIG. 18 is an explosive diagram of an internal stator of a motor structure according to an embodiment of the present disclosure. The internal stator (30) at least comprises a stator (31), a first insulating sleeve (32), a tie strap (34) and a second insulating sleeve (35), wherein the stator (31) is formed by stacking multiple silicon steel sheets (312), at least an enameled wire (311) is twined on the silicon steel sheets (312), a center position of the stator (31) comprises a hollow part (313) which the shaft (21) is sleeved to, the tie strap (34) is sleeved to the shaft (21), and the tie strap (34) has annular grooves (341) being surrounded by the tie strap (33), such that the tie strap (34) being sleeved to the shaft (21) contacts the silicon steel sheets (312), and the stator (31) is fixed to the shaft (21).

Figure 19:
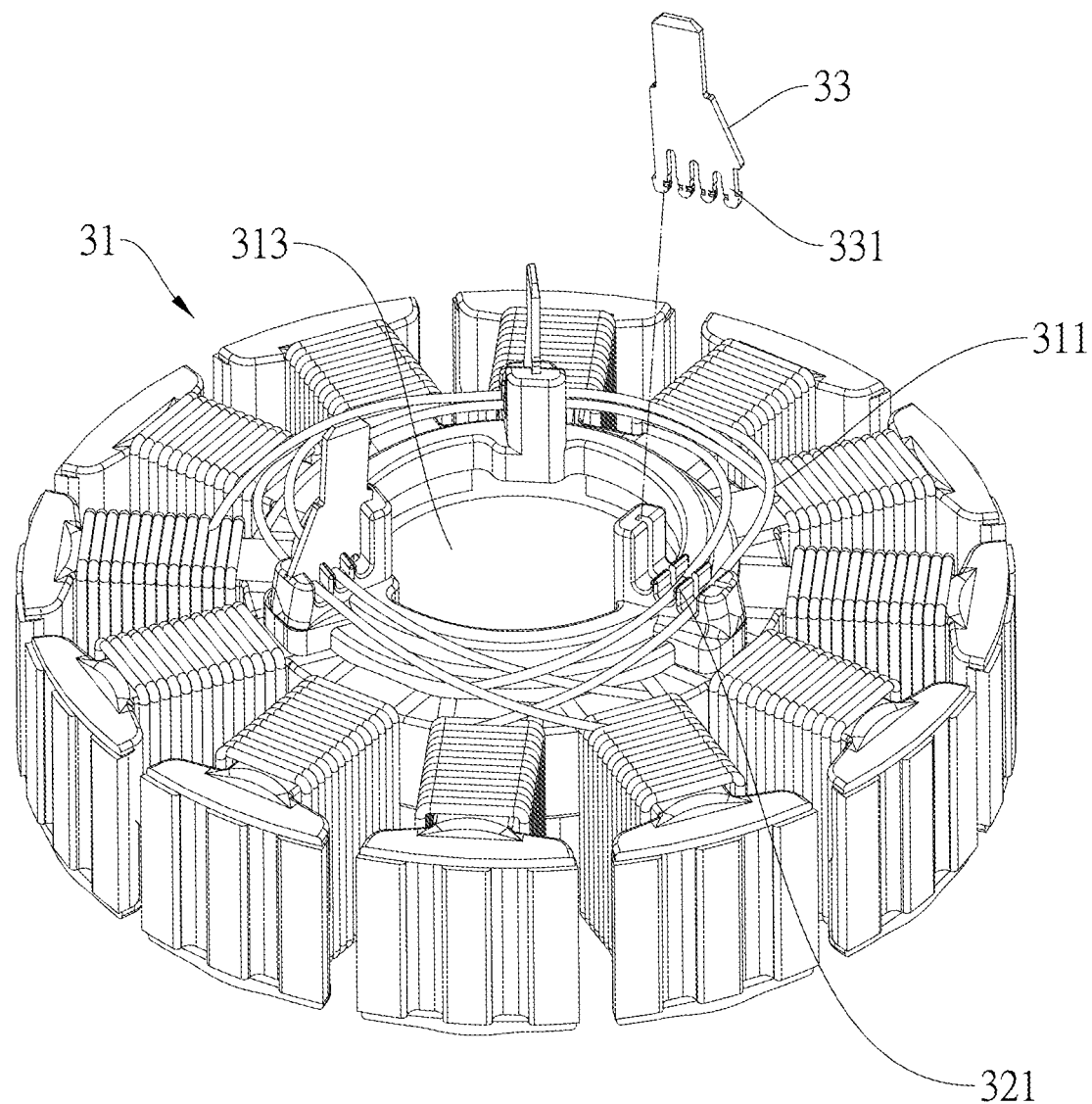
FIG. 19 is a first schematic diagram of a configuration of a pin of a motor structure according to an embodiment of the present disclosure.

Refer to FIG. 19, and FIG. 19 is a first schematic diagram of a configuration of a pin of a motor structure according to an embodiment of the present disclosure. The first insulating sleeve (32) and the second insulating sleeve (35) respectively cover two ends of the stator (31), the first insulating sleeve (32) has a least a slot (321), and the slot (321) is plugged with a pin (33), wherein the enameled wire (311) twines between the pin (33) and the slot (321), and the pin (33) and the enameled wire (311) has an non-vertical angle therebetween. The pin (33) is disposed with multiple grooves (331), and a width of the groove (331) is less than a wire diameter of the enameled wire (311). Thus, the pin (33) can pierce an insulating outer ring of the enameled wire (311) wound on the slot (321), so as to be electrically conductive with a metal core wire of the enameled wire (311) covered by the insulating outer ring.

Figure 20:
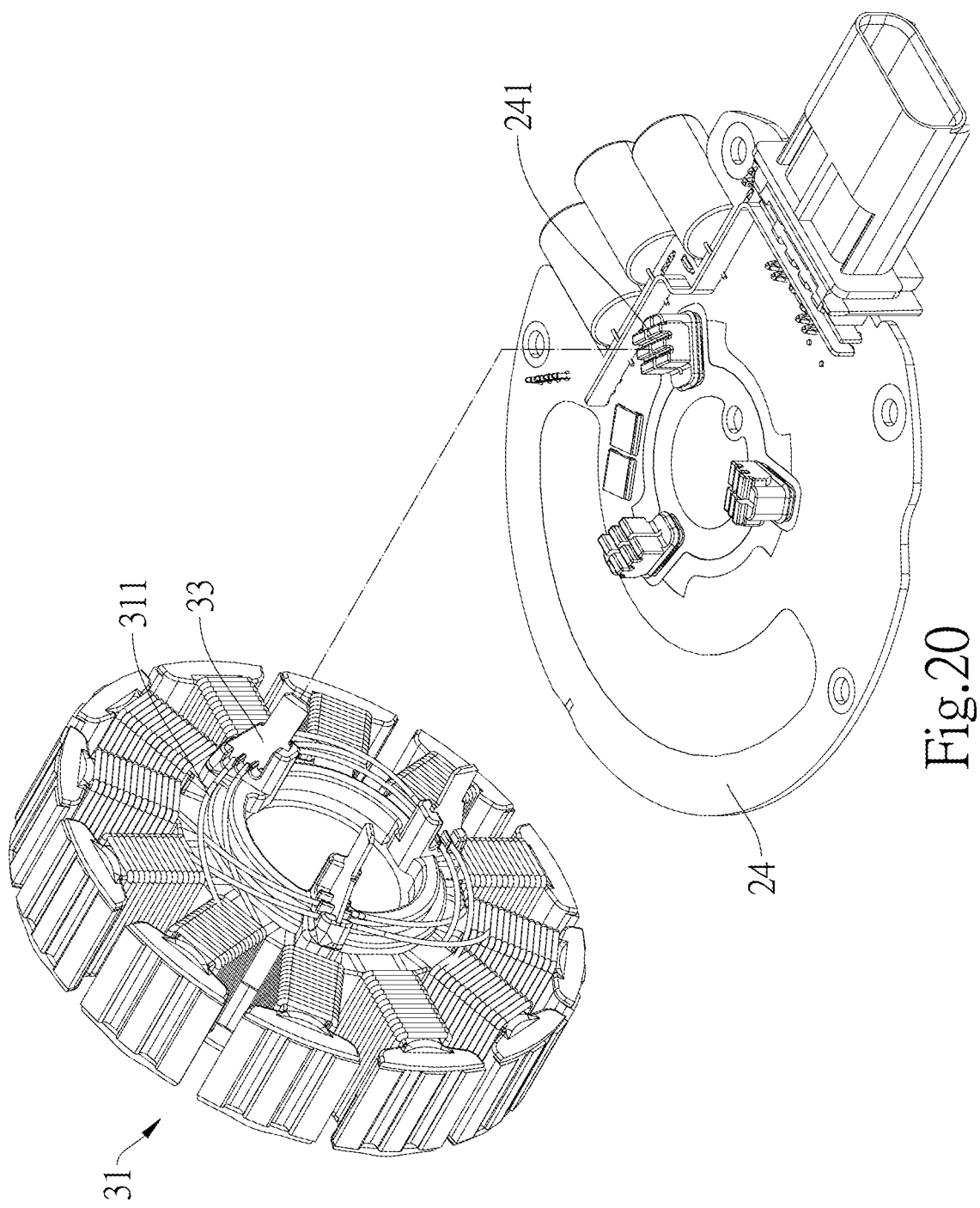
FIG. 20 is a second schematic diagram of a configuration of a pin of a motor structure according to an embodiment of the present disclosure.

Refer to FIG. 20, and FIG. 20 is a second schematic diagram of a configuration of a pin of a motor structure according to an embodiment of the present disclosure. The pin (33) pierces an insulating outer ring of the enameled wire (311) wound on the slot (321), so as to be electrically conductive with the enameled wire (311). When the stator (31) is engaged with the circuit board (24), the end of the pin (33) away from the slot (321) is in contact with and electrically connected to the connection terminal (241) of the circuit board (24), so as to transmit the electrical signal from the stator (31) to the circuit board (24).

As can be seen from the above description, the external rotor structure of the present disclosure has the following advantages compared with the prior art and products.

The external rotor structure of the present disclosure adopts the hardware design of covering the ring-shaped yoke iron part and the ring-shaped magnet part with polymer plastic material by in-mold injection, and it achieves the smooth operation and balance of the motor structure since the polymer plastic material is lightweight. Combined with through holes in the polymer plastic, the heat generated during the operation of the motor structure can be smoothly discharged to the outside, and the temperature difference between the inside and the outside caused by the operation of the motor structure can be balanced by heat convection. Through the application of polymer plastic material, the motor structure has advantages of lightweight and cost reduction.

The PCBA circuit board is provided, the connection part is for pin slotting and used to replace the conventional tin process for connection, thus effectively avoiding the problem of increasing the resistance of the overall electronic device caused by the conventional tin process, and the assembly is also easier. Further, the connection part inserted on the circuit board enables electronic components such as inductors or capacitors to be inserted on the connection part due to an angle design, and because there is no need to use solder, it can reduce time cost and personnel cost.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A motor structure, at least comprising:
an external rotor structure;
a buckle part; and
an internal stator,
wherein the external rotor structure at least comprises:
   a ring-shaped yoke iron part;
   a ring-shaped magnet part, wherein multiple magnets are arranged at intervals in an inner side portion of the ring-shaped yoke iron part to form the ring-shaped magnet part, wherein two adjacent ones of the multiple magnets have a first spacing therebetween; and
   a plastic part, covering an outer side portion of the ring-shaped yoke iron part and being filled into the first spacing,
wherein an upper surface of the ring-shaped magnet part is disposed coplanar to an upper side portion of the ring-shaped yoke iron part, and a lower surface of the ring-shaped magnet part is disposed coplanar to a lower side portion of the ring-shaped yoke iron part,
wherein corners of two ends of at least one of the multiple magnets are disposed with at least one bevel and the at least one bevel is covered by the plastic part,
wherein the plastic part at least comprises a top portion, a side portion and a filling portion, wherein the top portion is disposed to mask the upper side portion of the ring-shaped yoke iron part, the side portion is disposed to surround the outer side portion of the ring-shaped yoke iron part, and the filling portion is filled into each first spacing of each of the adjacent magnets,
wherein an inner surface of the ring-shaped magnet part being spaced away from the ring-shaped yoke iron part is coplanar to an inner surface of the filling portion being spaced away from the ring-shaped yoke iron part,
wherein the top portion at least comprises an upper top portion and a side top portion, the side top portion is disposed to surround a perimeter edge of the upper top portion, and the side top portion is formed with a stair structure,
wherein the upper top portion is disposed with multiple ribs being arranged at intervals, each of the ribs has a Y shape, and the ribs are radially extending and branched from a center portion of the upper top portion to the side top portion,
wherein the side top portion is disposed to have through holes which penetrate the top portion, wherein one side of each of the through holes is disposed with a baffle,
wherein the external rotor structure covers the buckle part and the internal stator is disposed in an accommodating space between the external rotor structure and the buckle part,
wherein the buckle part at least comprises a shaft, an upper cover, a lower cover and a circuit board, the shaft is protruding from the upper cover, and the lower cover and the upper cover are connected to each other by at least one fastener part, the circuit board is disposed between the upper cover and the lower cover, and a connection terminal is disposed to protrude from the circuit board, and
wherein the circuit board at least comprises an electronic component and at least a connection part thereon, and the connection part is used to electrically connect the electronic component with the circuit board in a solderless manner, and
wherein the internal stator at least comprises a stator, a first insulating sleeve, a tie strap and a second insulating sleeve, wherein the stator is formed by stacking multiple silicon steel sheets, at least an enameled wire is twined on the silicon steel sheets, a center position of the stator comprises a hollow part which the shaft is sleeved to, the tie strap is sleeved to the shaft, and the tie strap has annular grooves being surrounded by the tie strap, such that the tie strap being sleeved to the shaft contacts the silicon steel sheets, and the stator is fixed to the shaft.

2. The motor structure of claim 1, wherein the first insulating sleeve and the second insulating sleeve respectively cover two ends of the stator, the first insulating sleeve has a least a slot, and the slot is plugged with a pin, wherein the enameled wire twines between the pin and the slot, and the pin and the enameled wire have a non-vertical angle therebetween.

3. The motor structure of claim 2, wherein the pin is disposed with multiple grooves, and a width of each of the grooves is less than a wire diameter of the enameled wire.

* * * * *